(12) United States Patent
Chen et al.

(10) Patent No.: US 7,007,032 B1
(45) Date of Patent: Feb. 28, 2006

(54) METHOD AND APPARATUS FOR REMOVING REDUNDANCIES FROM A LIST OF DATA STRUCTURES

(75) Inventors: Shigang Chen, Santa Clara, CA (US); Partha Bhattacharya, Cupertino, CA (US); Liman Wei, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 497 days.

(21) Appl. No.: 10/188,725

(22) Filed: Jul. 1, 2002

(51) Int. Cl.
*G06F 17/00* (2006.01)
*G06F 7/00* (2006.01)

(52) U.S. Cl. .................. 707/101; 707/104.1; 713/200; 713/201; 709/225; 709/232

(58) Field of Classification Search ............... 707/1–5, 707/100–104.1, 9; 713/200, 201; 709/225, 709/232
See application file for complete search history.

(56) References Cited

U.S. PATENT DOCUMENTS

| 5,557,787 | A | * | 9/1996 | Shin et al. .................. 707/102 |
| 5,787,427 | A | * | 7/1998 | Benantar et al. ............... 707/9 |
| 5,884,306 | A | * | 3/1999 | Bliss et al. ..................... 707/7 |
| 5,950,195 | A | * | 9/1999 | Stockwell et al. ............. 707/4 |
| 6,167,445 | A | * | 12/2000 | Gai et al. .................... 709/223 |
| 6,247,030 | B1 | * | 6/2001 | Suzuki ........................ 715/509 |
| 6,381,601 | B1 | * | 4/2002 | Fujiwara et al. ............... 707/7 |
| 6,526,399 | B1 | * | 2/2003 | Coulson et al. ................ 707/1 |
| 2002/0078021 | A1 | * | 6/2002 | Lawton ......................... 707/1 |

* cited by examiner

Primary Examiner—Luke S Wassum
(74) Attorney, Agent, or Firm—Hickman Palermo Truong & Becker, LLP

(57) ABSTRACT

A method is disclosed for removing redundancies from a list of data structures. A list of data structures is sorted by first attribute into sub-lists having a common first attribute. Each of these sub-lists is sorted by second attribute into sub-lists having a common first attribute and a common second attribute. Each of these sub-lists is combined into a single combined data structure that includes a third attribute set. Each third attribute set includes third attributes of the data structures in the sub-list from which the combined data structure including that set was formed.

39 Claims, 5 Drawing Sheets

FIG. 2

| SOURCE | DESTINATION | SERVICE | ACTION |
|---|---|---|---|
| B | I | Y | PERMIT |
| D | K | X | PERMIT |
| C | J | Y | PERMIT |
| B | K | N | PERMIT |
| A | I | X | PERMIT |
| D | K | N | PERMIT |
| B | J | N | PERMIT |
| C | K | X | PERMIT |
| A | I | N | PERMIT |
| A | J | Y | PERMIT |
| C | J | N | PERMIT |
| D | J | Y | PERMIT |
| B | K | N | PERMIT |
| C | I | N | PERMIT |
| D | I | Y | PERMIT |
| A | J | Y | PERMIT |
| C | K | X | PERMIT |
| B | I | X | PERMIT |
| D | J | X | PERMIT |
| A | I | N | PERMIT |

FIG. 3

| SOURCE | DESTINATION | SERVICE | ACTION |
|---|---|---|---|
| A | I | X | PERMIT |
| A | I | N | PERMIT |
| A | J | Y | PERMIT |
| A | I | N | PERMIT |
| A | J | Y | PERMIT |
| A | I | X | PERMIT |
| B | K | Y | PERMIT |
| B | J | N | PERMIT |
| B | J | N | PERMIT |
| B | K | Y | PERMIT |
| B | J | Y | PERMIT |
| C | K | N | PERMIT |
| C | I | Y | PERMIT |
| C | J | X | PERMIT |
| C | K | N | PERMIT |
| C | J | Y | PERMIT |
| D | K | X | PERMIT |
| D | K | N | PERMIT |
| D | J | Y | PERMIT |
| D | I | N | PERMIT |
| D | I | X | PERMIT |

| SOURCE | DESTINATION | SERVICE | ACTION |
|---|---|---|---|
| A | I | X | PERMIT |
| A | I | Z | PERMIT |
| A | I | Y | PERMIT |
| A | J | Y | PERMIT |
| A | J | Z | PERMIT |
| A | I | X | PERMIT |
| B | J | Y | PERMIT |
| B | J | Z | PERMIT |
| B | K | Z | PERMIT |
| B | K | Y | PERMIT |
| C | J | Z | PERMIT |
| C | J | Y | PERMIT |
| C | K | Y | PERMIT |
| C | K | Z | PERMIT |
| C | K | X | PERMIT |
| D | I | X | PERMIT |
| D | I | Z | PERMIT |
| D | J | Y | PERMIT |
| D | K | Z | PERMIT |
| D | K | X | PERMIT |

FIG. 4

| SOURCE | DESTINATION | SERVICE | ACTION |
|---|---|---|---|
| A | I | {X,Y,Z} | PERMIT |
| A | J | {X,Y,Z} | PERMIT |
| B | I | {Y,Z} | PERMIT |
| B | J | {Y,Z} | PERMIT |
| B | K | {Y,Z} | PERMIT |
| C | J | {X,Y,Z} | PERMIT |
| C | K | {X,Y,Z} | PERMIT |
| D | I | {X,Z} | PERMIT |
| D | J | Y | PERMIT |
| D | K | {X,Z} | PERMIT |

FIG. 5

| SOURCE | DESTINATION | SERVICE | ACTION |
|---|---|---|---|
| A | {I,J} | {X,Y,Z} | PERMIT |
| B | {I,J,K} | {Y,Z} | PERMIT |
| C | {J,K} | {X,Y,Z} | PERMIT |
| D | I | {X,Z} | PERMIT |
| D | J | Y | PERMIT |
| D | K | {X,Z} | PERMIT |

FIG. 6

| SOURCE | DESTINATION | SERVICE | ACTION |
|---|---|---|---|
| D | I | {X,Z} | PERMIT |
| A | {I,J} | {X,Y,Z} | PERMIT |
| B | {I,J,K} | {Y,Z} | PERMIT |
| D | J | Y | PERMIT |
| C | {J,K} | {X,Y,Z} | PERMIT |
| D | K | {X,Z} | PERMIT |

FIG. 7

| SOURCE | DESTINATION | SERVICE | ACTION |
|---|---|---|---|
| A | {I,J} | {X,Y,Z} | PERMIT |
| C | {J,K} | {X,Y,Z} | PERMIT |
| D | I | {X,Z} | PERMIT |
| D | K | {X,Z} | PERMIT |
| D | J | Y | PERMIT |
| B | {I,J,K} | {Y,Z} | PERMIT |

FIG. 8

| SOURCE | DESTINATION | SERVICE | ACTION |
|---|---|---|---|
| A | {I,J} | {X,Y,Z} | PERMIT |
| C | {J,K} | {X,Y,Z} | PERMIT |
| D | {I,K} | {X,Z} | PERMIT |
| D | J | Y | PERMIT |
| B | {I,J,K} | {Y,Z} | PERMIT |

FIG. 9

METHOD AND APPARATUS FOR REMOVING REDUNDANCIES FROM A LIST OF DATA STRUCTURES

FIELD OF THE INVENTION

The present invention generally relates to data processing. The invention relates more specifically to a method and apparatus for removing redundancies from a list of data structures.

BACKGROUND OF THE INVENTION

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

An access control list (ACL) specifies what network traffic should be allowed and what traffic should be blocked. An ACL is a list of data structures. Each data structure includes multiple attributes (e.g., objects), such as source address, destination address, and action. An example ACL is shown below:

permit http 171.78.78.0/24 host 132.130.25.66
permit http 171.78.79.0/24 host 132.130.25.66
permit http 169.21.42.0/24 host 132.130.25.66
permit http 153.60.68.0/24 host 132.130.25.66
permit http 171.78.78.0/24 host 132.130.25.121
permit http 171.78.79.0/24 host 132.130.25.121
permit http 169.21.42.0/24 host 132.130.25.121
permit http 153.60.68.0/24 host 132.130.25.121

An ACL may be used to control operation of network infrastructure devices, such as firewalls. The above ACL allows four networks to access two web servers (host 132.130.25.66 and host 132.130.25.121).

Using an object grouping technique can reduce a size of an ACL. The object grouping technique allows multiple source addresses and multiple destination addresses to be placed in a single ACL entry. The technique compresses the size of the ACL by removing redundant information. Using the technique usually reduces the size of an ungrouped ACL to a fraction of that ACL's original size. A significant performance improvement results. Storing the ACL requires less memory. Filtering packets requires less time. The ACL can be transmitted in less time.

The object grouping technique can be used with other lists of data structures. For example, attributes of data structures in a security policy list may also be grouped. Each data structure (i.e., policy) in a security policy list includes, as attributes of that data structure, a source object, a destination object, a service, and an action. Each attribute of a data structure corresponds to a dimension of the security policy list. For each dimension of the security policy list, each data structure in the security policy list includes an attribute corresponding to that dimension. For example, one dimension may correspond to a source object of each data structure, one dimension may correspond to a destination object of each data structure, and one dimension may correspond to a service of each data structure.

If two data structures include a common action (e.g., permit) and common attributes corresponding to two of the three dimensions, then those two data structures can be combined into one combined data structure. The combined data structure includes the same common action and common attributes corresponding to those two dimensions. In its remaining attribute corresponding to the third dimension, the combined data structure includes a set that includes the uncommon third-dimension attributes of both of the data structures being combined. That set is called an object group. For example, two policies permit telnet from A to B
permit http from A to B can be combined into one policy permit {telnet, http} from A to B where {telnet, http} is a new service object group. Objects are optimally grouped if there are no data structures in the list that can be further combined.

However, some existing firewall software does not support object groups. ACLs and security policy lists formed for use with such software do not include object groups. When upgrading to firewall software that supports object groups, a human user is left with the frequently onerous task of manually grouping objects in an list that does not include object groups. Given that a usual list may include several thousand data structures, such manual grouping can be time-consuming and provides abundant opportunities for a human user to introduce errors. A human user may also have difficulty determining an optimal grouping for a list; that is, a human user may have difficulty grouping objects in the data structures of a list so that all redundant information is removed from those data structures.

One possible approach to object grouping is a pair-wise comparison approach. Using the pair-wise comparison approach, each policy in a security policy list is compared with every other policy in that list, and policies are combined if those policies have (1) the same action, and (2) two identical attributes in the same dimensions.

The pair-wise comparison approach has a time complexity of $O(n^2)$. For example, using the pair-wise comparison approach, a computer combined 25033 original policies into 222 combined policies in 3 minutes and 51 seconds. For a computer, that is a relatively long time.

Based on the foregoing, there is a clear need for a way of automatically and optimally removing redundant information from a list of data structures using an approach that has a time complexity of less than $O(n^2)$.

BRIEF DESCRIPTION OF THE DRAWINGS

The present invention is illustrated by way of example, and not by way of limitation, in the figures of the accompanying drawings and in which like reference numerals refer to similar elements and in which:

FIG. 2 is a block diagram that illustrates an example list of policies that have ungrouped attributes;

FIG. 3 is a block diagram illustrating the same list of policies sorted by source into same-source sub-lists;

FIG. 4 is a block diagram illustrating each same-source sub-list of the same list of policies also sorted by destination into same-source, same-destination sub-lists;

FIG. 5 is a block diagram illustrating the same-source, same-destination sub-lists of the same list of policies combined into policies that include service object groups;

FIG. 6 is a block diagram illustrating policies of the same list of policies combined into policies that include destination object groups;

FIG. 7 is a block diagram illustrating the same list of policies sorted by destination into same-destination sub-lists;

FIG. 8 is a block diagram illustrating the same list of policies sorted by service into same-service sub-lists;

FIG. 9 is a block diagram illustrating the same-service, same-source sub-lists of the same list of policies combined into policies that include destination object groups.

DETAILED DESCRIPTION OF THE PREFERRED EMBODIMENT

A method and apparatus for removing redundancies from a list of data structures is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 OVERVIEW
2.0 SORTING AND COMBINING POLICIES
3.0 EXAMPLE POLICY LIST
4.0 IMPLEMENTATION MECHANISMS—HARDWARE OVERVIEW
5.0 EXTENSIONS AND ALTERNATIVES 1.0 Overview Embodiments of the invention remove redundant information from a list of data structures such as policies, by sorting and combining those policies as described in further detail below. Example policies include ACL entries and security policies. From a list of data structures including ungrouped or sub-optimally grouped attributes, a list of data structures including optimally grouped attributes is formed. This formation is accomplished automatically (i.e., without slow, costly, and error-prone human intervention) with a time complexity of only $O(n \log n)$; much less than $O(n^2)$. Thus, the techniques described herein are especially beneficial when applied to very large lists. For example, using these techniques, a computer combined 25033 original policies into 222 combined policies in only 2 seconds. With redundancies removed, less memory is required to store a list of data structures, and lists of data structures can be transmitted between network devices in less time.

2.0 Sorting and Combining Policies

Figure 1:
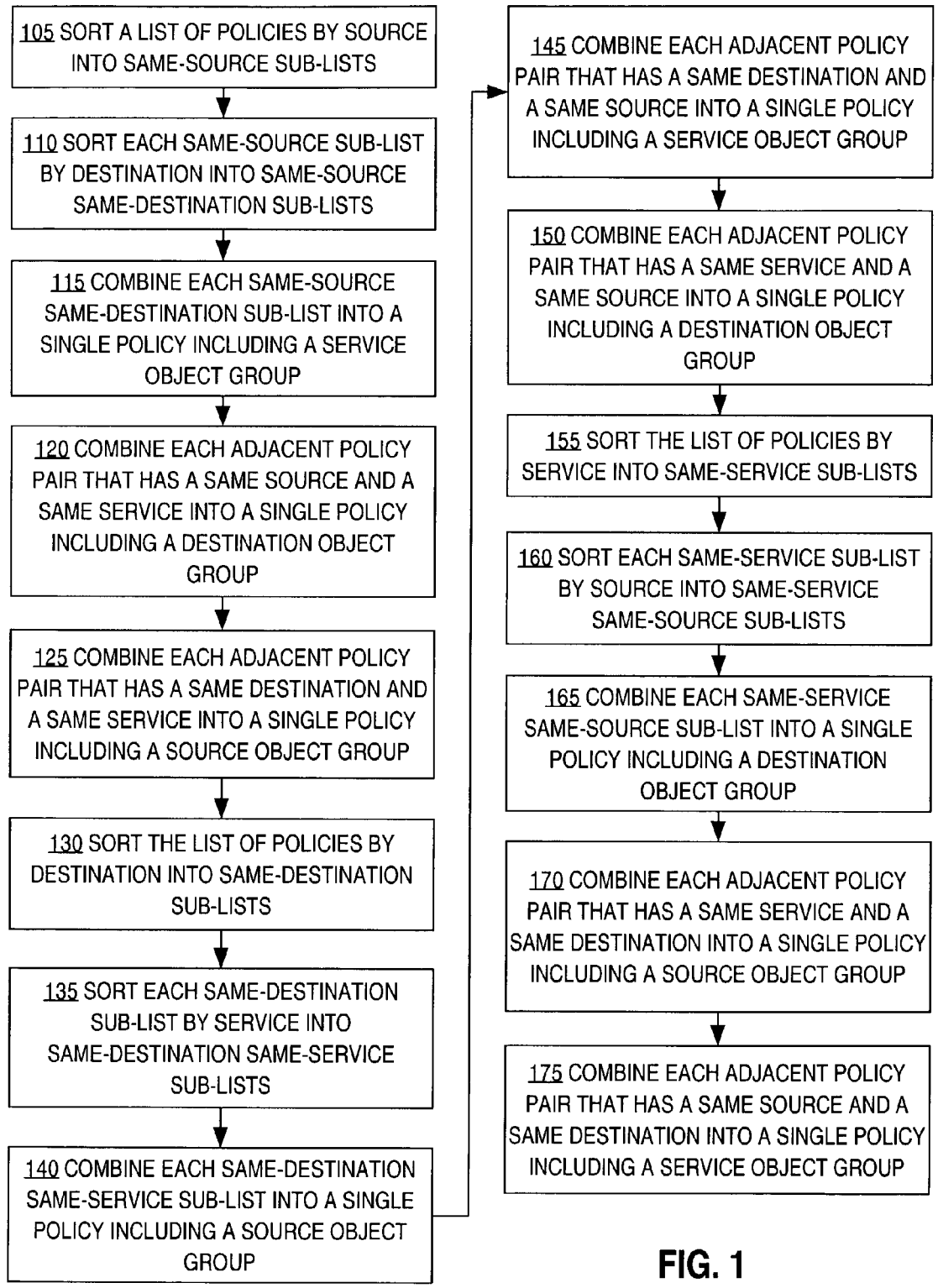
FIG. 1 is a flow diagram that illustrates a technique for sorting and combining policies.

FIG. 1 is a flow diagram that illustrates a technique for sorting and combining policies. While the technique is described with reference to policies, the technique is also applicable to other data structures. While the policies described below include a source, a destination, and a service, policies may include different attributes than these, and/or attributes additional to these. Example sources include Internet Protocol (IP) addresses of networks, sub-networks, hosts, and web servers. Example destinations include Internet Protocol (IP) addresses of networks, sub-networks, hosts, and web servers. Example services include protocols such as Hypertext Transfer Protocol (HTTP) and File Transfer Protocol (FTP). Embodiments are applicable to any data structures having two or more attributes.

In block 105, a list of policies is sorted by source into same-source sub-lists. As a result, each policy in a given same-source sub-list includes a common source object that is included by every policy in that sub-list. Any sorting algorithm may be used to sort lists and sub-lists.

In block 110, each same-source sub-list is sorted by destination into same-source, same-destination sub-lists. As a result, each policy in a given same-source, same-destination sub-list includes both a common source object and a common destination object, both of which are included by every policy in that same-source, same-destination sub-list.

In block 115, each same-source, same-destination sub-list is combined into a single combined policy for that sub-list. As a result, a given combined policy includes, as its source object and destination object, the common source object and the common destination object, respectively, of the policies of the sub-list from which that combined policy was formed. Furthermore, each combined policy includes a service object group for that combined policy. Each service object group is an ordered set of service objects that includes, without duplication, the service objects of each policy in the same-source, same-destination sub-list from which that combined policy was formed.

In block 120, each pair of policies that are adjacent to each other in the list (the list then being comprised of (1) the combined policies for each sub-list and (2) any other policies which were not combined) is compared. If each of the policies in the pair includes a common source object and a common service object (which may be a service object group), then those two policies are combined into a single policy. That single policy includes, as its source object and service object, the common source object and the common service object, respectively, of the policies in the pair. That single policy also includes, as its destination object, a destination object group. That destination object group is an ordered set that includes, without duplication, the destination objects of each policy in the pair. The next pair of policies to be compared in block 120 may include the newly formed policy.

In block 125, each pair of policies that are adjacent to each other in the list (the list then being comprised of (1) the policies newly formed in block 120 and (2) any other policies which were not involved in such a formation) is compared. If each of the policies in the pair includes a common destination object (which may be a destination object group) and a common service object (which may be a service object group), then those two policies are combined into a single policy. That single policy includes, as its destination object and service object, the common destination object and the common service object, respectively, of the policies in the pair. That single policy also includes, as its source object, an ordered set that includes, without duplication, the source objects of each policy in the pair. The next pair of policies to be compared in block 125 may include the newly formed policy.

In blocks 130–150, the technique described above with reference to blocks 105–125 is performed again, except that, in that description, the destination object is substituted in the place of the source object, the service object is substituted in the place of the destination object, and the source object is substituted in the place of the service object. In this way, newly formed policies may be located adjacent to policies with which those newly formed policies were not formerly, thereby providing further opportunities for combination.

In block 130, the list of policies (including the newly formed policies) is sorted by destination into same-destination sub-lists. As a result, each policy in a given same-destination sub-list includes a common destination object that is included by every policy in that sub-list. When sorting policies that include one or more object groups, those policies may be sorted as if each object group included a concatenation of the objects in that object group. Thus, for example, an object group {A, B, C} may be treated in sorting as "ABC".

In block 135, each same-destination sub-list is sorted by service into same-destination, same-service sub-lists. As a result, each policy in a given same-destination, same-service sub-list includes both a common destination object and a common service object, both of which are included by every policy in that same-destination, same-service sub-list.

In block 140, each same-destination, same-service sub-list is combined into a single combined policy for that sub-list. As a result, a given combined policy includes, as its destination object and service object, the common destination object and the common source object, respectively, of the policies of the sub-list from which that combined policy was formed. Furthermore, each combined policy includes a source object group for that combined policy. Each source object group is an ordered set of source objects that includes, without duplication, the source objects of each policy in the same-destination, same-service sub-list from which that combined policy was formed.

In block 145, each pair of policies that are adjacent to each other in the list is compared. If each of the policies in the pair includes a common destination object and a common source object, then those two policies are combined into a single policy. That single policy includes, as its destination object and source object, the common destination object and the common source object, respectively, of the policies in the pair. That single policy also includes, as its service object, a service object group. That service object group is an ordered set that includes, without duplication, the service objects of each policy in the pair. The next pair of policies to be compared in block 145 may include the newly formed policy.

In block 150, each pair of policies that are adjacent to each other in the list are compared. If each of the policies in the pair includes a common service object and a common source object, then those two policies are combined into a single policy. That single policy includes, as its service object and source object, the common service object and the common source object, respectively, of the policies in the pair. That single policy also includes, as its destination object, an ordered set that includes, without duplication, the destination objects of each policy in the pair. The next pair of policies to be compared in block 150 may include the newly formed policy.

In blocks 155–175, the technique described above with reference to blocks 105–125 is performed again, except that, in that description, the service object is substituted in the place of the source object, the source object is substituted in the place of the destination object, and the destination object is substituted in the place of the service object.

In block 155, the list of policies is sorted by service into same-service sub-lists. As a result, each policy in a given same-service sub-list includes a common service object that is included by every policy in that sub-list.

In block 160, each same-service sub-list is sorted by source into same-service, same-source sub-lists. As a result, each policy in a given same-service, same-source sub-list includes both a common service object and a common source object, both of which are included by every policy in that same-service, same-source sub-list.

In block 165, each same-service, same-source sub-list is combined into a single combined policy for that sub-list. As a result, a given combined policy includes, as its service object and source object, the common service object and the common destination object, respectively, of the policies of the sub-list from which that combined policy was formed. Furthermore, each combined policy includes a destination object group for that combined policy. Each destination object group is an ordered set of destination objects that includes, without duplication, the destination objects of each policy in the same-service, same-source sub-list from which that combined policy was formed.

In block 170, each pair of policies that are adjacent to each other in the list is compared. If each of the policies in the pair includes a common service object and a common destination object, then those two policies are combined into a single policy. That single policy includes, as its service object and destination object, the common service object and the common destination object, respectively, of the policies in the pair. That single policy also includes, as its source object, a source object group. That source object group is an ordered set that includes, without duplication, the source objects of each policy in the pair. The next pair of policies to be compared in block 170 may include the newly formed policy.

In block 175, each pair of policies that are adjacent to each other in the list is compared. If each of the policies in the pair includes a common source object and a common destination object, then those two policies are combined into a single policy. That single policy includes, as its source object and destination object, the common source object and the common destination object, respectively, of the policies in the pair. That single policy also includes, as its service object, an ordered set that includes, without duplication, the service objects of each policy in the pair. The next pair of policies to be compared in block 175 may include the newly formed policy.

When the above techniques are applied to a list of data structures including ungrouped or sub-optimally grouped attributes, a list of data structures including optimally grouped attributes is formed. While, in the above example, the technique of blocks 105–125 precedes the technique of blocks 130–150, and the technique of blocks 130–150 precedes the technique of blocks 155–175, the techniques of each of these sequences of blocks could clearly be applied in other orders to produce identical lists.

Clearly, the above techniques can be applied to lists of data structures that include more attributes than the example data structures described above. In the above techniques, data structures may be sorted by more than two attributes, and pairs of data structures may be combined if they have more than two attributes in common. For example, in a list of data structures having N attributes, the above techniques may provide that two policies may be combined if N–1 of the attributes of those policies are common to both policies.

Example policies may additionally include an action. Example actions include "permit" and "deny". In one embodiment, the techniques described above are applied to lists of data structures that include a common action. The action may be excluded from the attributes by which policies are sorted and combined as described above.

3.0 Example Policy List

FIG. 2 is a block diagram that illustrates an example list of data structures or policies that have ungrouped attributes. Each data structure includes, as its attributes, a source object, a destination object, a service object, and an action.

FIG. 3 is a block diagram illustrating the same list of policies sorted by source into same-source sub-lists. While four same-source sub-lists (i.e., having source objects A, B, C, and D, respectively) are included in the example list, other sorted lists could include fewer or more same-source sub-lists. Each same-source sub-list includes a source object common to that same-source sub-list. The same-source sub-lists may be a result, for example, of the sorting performed in block 105.

FIG. 4 is a block diagram illustrating each same-source sub-list of the same list of policies also sorted by destination into same-source, same-destination sub-lists. While ten same-source, same-destination sub-lists (i.e., having source and destination objects [A, I], [A, J], [B, I], [B, J], [B, K], [C, J], [C, K], [D, I], [D, J], and [D, K], respectively) are included in the example list, other sorted lists could include fewer or more same-source, same-destination sub-lists. Each same-source sub-list includes a source object and a destination object common to that same-source, same-destination sub-list. The same-source, same-destination sub-lists may be a result, for example, of the sorting performed in block 110.

FIG. 5 is a block diagram illustrating the same-source, same-destination sub-lists of the same list of policies combined into policies that include service object groups. In the example list, policies [A, I, X], [A, I, Z], and [A, I, Y] have been combined into policy [A, I, {X, Y, Z}]. Policies [A, J, Y], [A, J, Z], and [A, J, X] have been combined into policy [A, J, {X, Y, Z}].

Policies [B, I, Y] and [B, I, Z] have been combined into policy [B, I, {Y, Z}]. Policies [B, J, Z] and [B, J, Y] have been combined into policy [B, J, {Y, Z}]. Policies [B, K, Z] and [B, K, Y] have been combined into policy [B, K, {Y, Z}].

Policies [C, J, Y], [C, J, Z], and [C, J, X] have been combined into policy [C, J, {X, Y, Z}]. Policies [C, K, X], [C, K, Z], and [C, K, Y] have been combined into policy [C, K, {X, Y, Z}].

Policies [D, I, Z] and [D, I, X] have been combined into policy [D, I, {X, Z}]. Policy [D, J, Y] has not been combined with any other policy, and therefore remains unmodified in the list. Policies [D, K, X] and [D, K, Z] have been combined into policy [D, K, {X, Z}]. The combined policies may be a result, for example, of the combining performed in block 115.

FIG. 6 is a block diagram illustrating policies of the same list of policies combined into policies that include destination object groups. In the example list, policies [A, I, {X, Y, Z}] and [A, J, {X, Y, Z}] have been combined into policy [A, {I, J}, {X, Y, Z}]. Policies [B, I, {Y, Z}], [B, J, {Y, Z}], and [B, K, {Y, Z}] have been combined into policy [B, {I, J, K}, {Y, Z}]. Policies [C, J, {X, Y, Z}] and [C, K, {X, Y, Z}] have been combined into policy [C, {J, K}, {X, Y, Z}]. Policies [D, I, {X, Z}], [D, J, Y], and [D, K, {X, Z}] have not been combined, and therefore remain unmodified in the list. While policies [D, I, {X, Z}] and [D, K, {X, Z}] could be combined if they were adjacent, sorting has not yet made them adjacent. The combined policies may be a result, for example, of the combining performed in block 120. Regarding the example list, the combining performed in block 125 would, in this instance, not result in any policies being further combined.

FIG. 7 is a block diagram illustrating the same list of policies sorted by destination into same-destination sub-lists. Each same-destination sub-list includes a destination object (which may be a destination object group) common to that same-destination sub-list. The same-destination sub-lists may be a result, for example, of the sorting performed in block 130. Regarding the example list, the sorting performed in block 135 would not, in this instance, result in the movement of any policies, as none of the same-destination sub-lists include more than one policy. Nor, in this instance, would the combining performed in any of blocks 140, 145, or 150 result in any policies of the example list being combined.

FIG. 8 is a block diagram illustrating the same list of policies sorted by service into same-service sub-lists. Each same-service sub-list includes a service object (which may be a service object group) common to that same-service sub-list. The same-service sub-lists may be a result, for example, of the sorting performed in block 155. Incidentally each same-service sub-list of the example list is already sorted by source, so the sorting performed in block 160 would produce no effect in this instance.

FIG. 9 is a block diagram illustrating the same-service, same-source sub-lists of the same list of policies combined into policies that include destination object groups. In the example list, policies [D, I, {X, Z}] and [D, K, {X, Z}], which could not be combined earlier because of non-adjacency, have now been combined into policy [D, {I, K}, {X, Z}]. None of the other policies have been combined, and therefore remain unmodified in the list. The combined policy may be a result, for example, of the combining performed in block 165. Regarding the example list, the combining performed in blocks 170 and 175 would, in this instance, not result in any policies being further combined. The example list now includes policies that include optimally grouped attributes. While the policies in the example list do not include any source object groups, other lists resulting from the techniques described above clearly could include source groups.

4.0 Implementation Mechanisms—Hardware Overview

Figure 10:
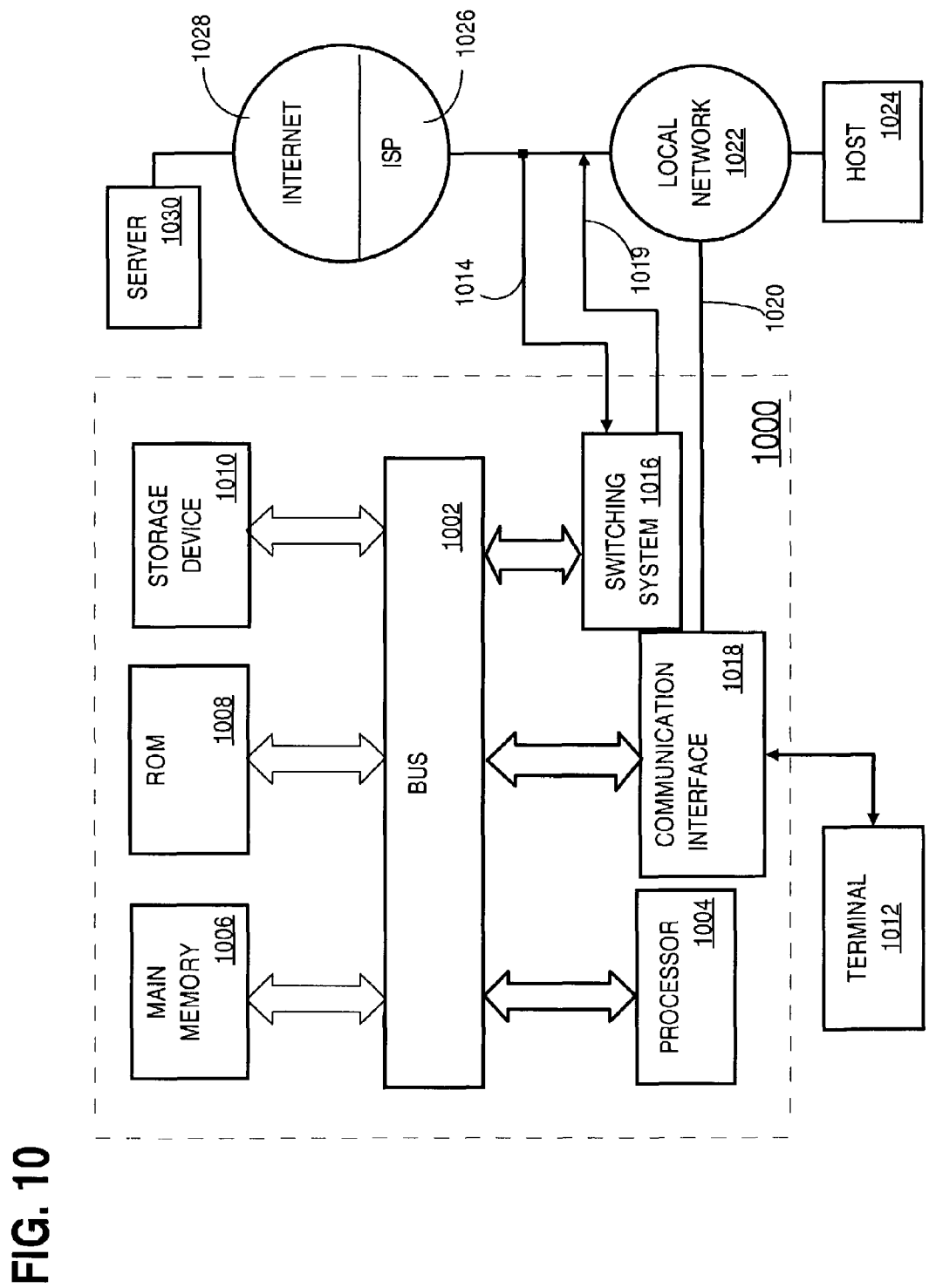
FIG. 10 is a block diagram that illustrates a computer system upon which an embodiment may be implemented.

FIG. 10 is a block diagram that illustrates a computer system 1000 upon which an embodiment of the invention may be implemented. The preferred embodiment is implemented using one or more computer programs running on a network element such as a router device. Thus, in this embodiment, the computer system 1000 equals a router.

Computer system 1000 includes a bus 1002 or other communication mechanism for communicating information, and a processor 1004 coupled with bus 1002 for processing information. Computer system 1000 also includes a main memory 1006, such as a random access memory (RAM), flash memory, or other dynamic storage device, coupled to bus 1002 for storing information and instructions to be executed by processor 1004. Main memory 1006 also may be used for storing temporary variables or other intermediate information during execution of instructions to be executed by processor 1004. Computer system 1000 further includes a read only memory (ROM) 1008 or other static storage device coupled to bus 1002 for storing static information and instructions for processor 1004. A storage device 1010, such as a magnetic disk, flash memory or optical disk, is provided and coupled to bus 1002 for storing information and instructions.

An communication interface 1018 may be coupled to bus 1002 for communicating information and command selections to processor 1004. Interface 1018 equals a conventional serial interface such as an RS-232 or RS-422 interface. An external terminal 1012 or other computer system connects to the computer system 1000 and provides commands to it using the interface 1014. Firmware or software running in the computer system 1000 provides a terminal interface or character-based command interface so that external commands can be given to the computer system.

A switching system 1016 is coupled to bus 1002 and has an input interface 1014 and an output interface 1019 to one or more external network elements. The external network elements may include a local network 1022 coupled to one or more hosts 1024, or a global network such as Internet 1028 having one or more servers 1030. The switching system 1016 switches information traffic arriving on input interface 1014 to output interface 1019 according to predetermined protocols and conventions that are well known. For example, switching system 1016, in cooperation with processor 1004, can determine a destination of a packet of data arriving on input interface 1014 and send it to the correct destination using output interface 1019. The destinations may include host 1024, server 1030, other end stations, or other routing and switching devices in local network 1022 or Internet 1028.

The invention is related to the use of computer system 1000 for removing redundancies from a list of data structures. According to one embodiment of the invention, data structures are provided by computer system 1000 in response to processor 1004 executing one or more sequences of one or more instructions contained in main memory 1006. Such instructions may be read into main memory 1006 from another computer-readable medium, such as storage device 1010. Execution of the sequences of instructions contained in main memory 1006 causes processor 1004 to perform the process steps described herein. One or more processors in a multi-processing arrangement may also be employed to execute the sequences of instructions contained in main memory 1006. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 1004 for execution. Such a medium may take many forms, including but not limited to, non-volatile media, volatile media, and transmission media. Non-volatile media includes, for example, optical or magnetic disks, such as storage device 1010. Volatile media includes dynamic memory, such as main memory 1006. Transmission media includes coaxial cables, copper wire and fiber optics, including the wires that comprise bus 1002. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 1004 for execution. For example, the instructions may initially be carried on a magnetic disk of a remote computer. The remote computer can load the instructions into its dynamic memory and send the instructions over a telephone line using a modem. A modem local to computer system 1000 can receive the data on the telephone line and use an infrared transmitter to convert the data to an infrared signal. An infrared detector coupled to bus 1002 can receive the data carried in the infrared signal and place the data on bus 1002. Bus 1002 carries the data to main memory 1006, from which processor 1004 retrieves and executes the instructions. The instructions received by main memory 1006 may optionally be stored on storage device 1010 either before or after execution by processor 1004.

Communication interface 1018 also provides a two-way data communication coupling to a network link 1020 that is connected to a local network 1022. For example, communication interface 1018 may be an integrated services digital network (ISDN) card or a modem to provide a data communication connection to a corresponding type of telephone line. As another example, communication interface 1018 may be a local area network (LAN) card to provide a data communication connection to a compatible LAN. Wireless links may also be implemented. In any such implementation, communication interface 1018 sends and receives electrical, electromagnetic or optical signals that carry digital data streams representing various types of information.

Network link 1020 typically provides data communication through one or more networks to other data devices. For example, network link 1020 may provide a connection through local network 1022 to a host computer 1024 or to data equipment operated by an Internet Service Provider (ISP) 1026. ISP 1026 in turn provides data communication services through the world wide packet data communication network now commonly referred to as the "Internet" 1028. Local network 1022 and Internet 1028 both use electrical, electromagnetic or optical signals that carry digital data streams. The signals through the various networks and the signals on network link 1020 and through communication interface 1018, which carry the digital data to and from computer system 1000, are example forms of carrier waves transporting the information.

Computer system 1000 can send messages and receive data, including program code, through the network(s), network link 1020 and communication interface 1018. In the Internet example, a server 1030 might transmit a requested code for an application program through Internet 1028, ISP 1026, local network 1022 and communication interface 1018. In accordance with the invention, one such downloaded application provides for removing redundancies from a list of data structures as described herein.

The received code may be executed by processor 1004 as it is received, and/or stored in storage device 1010, or other non-volatile storage for later execution. In this manner, computer system 1000 may obtain application code in the form of a carrier wave.

5.0 Extension and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of removing redundancies from an original list of data structures, the method comprising the computer-implemented steps of:

sorting the original list of data structures into lists that include at least a first list and a second list, wherein a first attribute of each data structure in the first list equals a first value, and wherein a first attribute of each data structure in the second list equals a second value;

sorting data structures in the first list into sub-lists that include at least a first sub-list and a second sub-list, wherein a second attribute of each data structure in the first sub-list equals a third value, and wherein a second attribute of each data structure in the second sub-list equals a fourth value;

sorting data structures in the second list into sub-lists that include at least a third sub-list and a fourth sub-list, wherein a second attribute of each data structure in the third sub-list equals a fifth value, and wherein a second attribute of each data structure in the fourth sub-list equals a sixth value; and combining data structures in the first sub-list into a first data structure, wherein a third attribute of the first data structure equals a set that includes, without duplication, third attributes of each data structure in the first sub-list;

wherein said combining reduces a size of the original list.

2. A method as recited in claim 1, further comprising the steps of:

combining data structures in the second sub-list into a second data structure, wherein a third attribute of the second data structure equals a set that includes third attributes of each data structure in the second sub-list;

combining data structures in the third sub-list into a third data structure, wherein a third attribute of the third data structure equals a set that includes third attributes of each data structure in the third sub-list; and combining data structures in the fourth sub-list into a fourth data structure, wherein a third attribute of the fourth data structure equals a set that includes third attributes of each data structure in the fourth sub-list.

3. A method as recited in claim 2, further comprising the steps of:

if a first attribute of the first data structure equals a first attribute of the second data structure, and if a third attribute of the first data structure equals a third attribute of the second data structure, then combining the first data structure and the second data structure into a fifth data structure, wherein a second attribute of the fifth data structure equals a first set that includes a second attribute of the first data structure, wherein the first set includes a second attribute of the second data structure;

if a first attribute of a sixth data structure equals a first attribute of the third data structure, and if a third attribute of the sixth data structure equals the third attribute of the third data structure, then combining the sixth data structure and the third data structure into a seventh data structure, wherein a second attribute of the seventh data structure equals a second set that includes a second attribute of the third data structure, wherein the second set includes a second attribute of the sixth data structure; and if a first attribute of an eighth data structure equals a first attribute of the fourth data structure, and if a third attribute of the eighth data structure equals the third attribute of the fourth data structure, then combining the eighth data structure and the fourth data structure into a ninth data structure, wherein a second attribute of the ninth data structure equals a third set that includes a second attribute of the fourth data structure, wherein the third set includes a second attribute of the eighth data structure.

4. A method as recited in claim 3, further comprising the steps of:

if a second attribute of a tenth data structure equals a second attribute of an eleventh data structure, and if a third attribute of the tenth data structure equals a third attribute of the eleventh data structure, then combining the tenth data structure and the eleventh data structure into a twelfth data structure, wherein a first attribute of the twelfth data structure equals a fourth set that includes a first attribute of the tenth data structure, wherein the fourth set includes a first attribute of the eleventh data structure;

if a second attribute of a thirteenth data structure equals a second attribute of a fourteenth data structure, and if a third attribute of the thirteenth data structure equals a third attribute of the fourteenth data structure, then combining the thirteenth data structure and the fourteenth data structure into a fifteenth data structure, wherein a first attribute of the fifteenth data structure equals a fifth set that includes a first attribute of the thirteenth data structure, wherein the fifth set includes a first attribute of the fourteenth data structure; and if a second attribute of a sixteenth data structure equals a second attribute of a seventeenth data structure, and if a third attribute of the sixteenth data structure equals a third attribute of the seventeenth data structure, then combining the sixteenth data structure and the seventeenth data structure into an eighteenth data structure, wherein a first attribute of the eighteenth data structure equals a sixth set that includes a first attribute of the sixteenth data structure, wherein the sixth set includes a first attribute of the seventeenth data structure.

5. A method as recited in claim 4, further comprising the steps of:

sorting data structures, including the fifth, seventh, ninth, twelfth, and fifteenth data structures, into lists that include at least a third list and a fourth list, wherein a second attribute of each data structure in the third list equals a seventh value, and wherein a second attribute of each data structure in the fourth list equals an eighth value;

sorting data structures in the third list into sub-lists that include at least a fifth sub-list and a sixth sub-list, wherein a third attribute of each data structure in the fifth sub-list equals a ninth value, and wherein a third attribute of each data structure in the sixth sub-list equals a tenth value;

sorting data structures in the fourth list into sub-lists that include at least a seventh sub-list and an eighth sub-list, wherein a third attribute of each data structure in the seventh sub-list equals an eleventh value, and wherein a third attribute of each data structure in the eighth sub-list equals a twelfth value; and combining data structures in the fifth sub-list into a nineteenth data structure, wherein a first attribute of the nineteenth data structure equals a set that includes first attributes of each data structure in the fifth sub-list.

6. A method as recited in claim 5, further comprising the steps of:

combining data structures in the sixth sub-list into a twentieth data structure, wherein a first attribute of the twentieth data structure equals a set that includes first attributes of each data structure in the sixth sub-list;

combining data structures in the seventh sub-list into a twenty-first data structure, wherein a first attribute of the twenty-first data structure equals a set that includes first attributes of each data structure in the seventh sub-list; and combining data structures in the eighth sub-list into a twenty-second data structure, wherein a first attribute of the twenty-second data structure equals a set that includes first attributes of each data structure in the eighth sub-list.

7. A method as recited in claim 6, further comprising the steps of:
if a second attribute of the nineteenth data structure equals a second attribute of the twentieth data structure, and if a first attribute of the nineteenth data structure equals a first attribute of the twentieth data structure, then combining the nineteenth data structure and the twentieth data structure into a twenty-third data structure, wherein a third attribute of the twenty-third data structure equals a seventh set that includes a third attribute of the nineteenth data structure, wherein the seventh set includes a third attribute of the twentieth data structure;
if a second attribute of a twenty-fourth data structure equals a second attribute of the twenty-first data structure, and if a first attribute of the twenty-fourth data structure equals the first attribute of the twenty-first data structure, then combining the twenty-fourth data structure and the twenty-first data structure into a twenty-fifth data structure, wherein a third attribute of the twenty-fifth data structure equals an eighth set that includes a third attribute of the twenty-first data structure, wherein the eighth set includes a third attribute of the twenty-fourth data structure; and
if a second attribute of a twenty-sixth data structure equals a second attribute of the twenty-second data structure, and if a first attribute of the twenty-sixth data structure equals the first attribute of the twenty-second data structure, then combining the twenty-sixth data structure and the twenty-second data structure into a twenty-seventh data structure, wherein a third attribute of the twenty-seventh data structure equals a ninth set that includes a third attribute of the twenty-second data structure, wherein the ninth set includes a third attribute of the twenty-sixth data structure.

8. A method as recited in claim 7, further comprising the steps of:
if a third attribute of a twenty-eighth data structure equals a third attribute of a twenty-ninth data structure, and if a first attribute of the twenty-eighth data structure equals a first attribute of the twenty-ninth data structure, then combining the twenty-eighth data structure and the twenty-ninth data structure into a thirtieth data structure, wherein a second attribute of the thirtieth data structure equals a tenth set that includes a second attribute of the twenty-eighth data structure, wherein the tenth set includes a second attribute of the twenty-ninth data structure;
if a third attribute of a thirty-first data structure equals a third attribute of a thirty-second data structure, and if a first attribute of the thirty-first data structure equals a first attribute of the thirty-second data structure, then combining the thirty-first data structure and the thirty-second data structure into a thirty-third data structure, wherein a second attribute of the thirty-third data structure equals an eleventh set that includes a second attribute of the thirty-first data structure, wherein the eleventh set includes a second attribute of the thirty-second data structure; and
if a third attribute of a thirty-fourth data structure equals a third attribute of a thirty-fifth data structure, and if a first attribute of the thirty-fourth data structure equals a first attribute of the thirty-fifth data structure, then combining the thirty-fourth data structure and the thirty-fifth data structure into a thirty-sixth data structure, wherein a second attribute of the thirty-sixth data structure equals an eleventh set that includes a second attribute of the thirty-fourth data structure, wherein the eleventh set includes a second attribute of the thirty-fifth data structure.

9. A method as recited in claim 8, further comprising the steps of:
sorting data structures, including the twenty-third, twenty-fifth, twenty-seventh, thirtieth, thirty-third, and thirty-sixth data structures, into lists that include at least a fifth list and a sixth list, wherein a third attribute of each data structure in the fifth list equals a thirteenth value, and wherein a third attribute of each data structure in the sixth list equals a fourteenth value;
sorting data structures in the fifth list into sub-lists that include at least a ninth sub-list and a tenth sub-list, wherein a first attribute of each data structure in the ninth sub-list equals a fifteenth value, and wherein a first attribute of each data structure in the tenth sub-list equals a sixteenth value;
sorting data structures in the sixth list into sub-lists that include at least a eleventh sub-list and a twelfth sub-list, wherein a first attribute of each data structure in the eleventh sub-list equals a seventeenth value, and wherein a first attribute of each data structure in the twelfth sub-list equals an eighteenth value; and
combining data structures in the ninth sub-list into a thirty-seventh data structure, wherein a second attribute of the thirty-seventh data structure equals a set that includes second attributes of each data structure in the ninth sub-list.

10. A method as recited in claim 9, further comprising the steps of:
combining data structures in the tenth sub-list into a thirty-eighth data structure, wherein a second attribute of the thirty-eighth data structure equals a set that includes second attributes of each data structure in the tenth sub-list;
combining data structures in the eleventh sub-list into a thirty-ninth data structure, wherein a second attribute of the thirty-ninth data structure equals a set that includes second attributes of each data structure in the eleventh sub-list; and
combining data structures in the twelfth sub-list into a fortieth data structure, wherein a second attribute of the fortieth data structure equals a set that includes second attributes of each data structure in the twelfth sub-list.

11. A method as recited in claim 10, further comprising the steps of:
if a third attribute of the thirty-seventh data structure equals a third attribute of the thirty-eighth data structure, and if a second attribute of the thirty-seventh data structure equals a second attribute of the thirty-eighth data structure, then combining the thirty-seventh data structure and the thirty-eighth data structure into a forty-first data structure, wherein a first attribute of the forty-first data structure equals a twelfth set that includes a first attribute of the thirty-seventh data structure, wherein the twelfth set includes a first attribute of the thirty-eighth data structure;
if a third attribute of a forty-second data structure equals a third attribute of the thirty-ninth data structure, and if a second attribute of the forty-second data structure equals the second attribute of the thirty-ninth data structure, then combining the forty-second data structure and the thirty-ninth data structure into a forty-third data structure, wherein a first attribute of the forty-third data structure equals a thirteenth set that includes a first attribute of the thirty-ninth data structure, wherein the thirteenth set includes a first attribute of the forty-second data structure; and if a third attribute of a forty-fourth data structure equals a third attribute of the fortieth data structure, and if a second attribute of the forty-fourth data structure equals the second attribute of the fortieth data structure, then combining the forty-fourth data structure and the fortieth data structure into a forty-fifth data structure, wherein a first attribute of the forty-fifth data structure equals a fourteenth set that includes a first attribute of the fortieth data structure, wherein the fourteenth set includes a first attribute of the forty-fourth data structure.

12. A method as recited in claim 11, further comprising the steps of:

if a first attribute of a forty-sixth data structure equals a first attribute of a forty-seventh data structure, and if a second attribute of the forty-sixth data structure equals a second attribute of the forty-seventh data structure, then combining the forty-sixth data structure and the forty-seventh data structure into a forty-eighth data structure, wherein a third attribute of the forty-eighth data structure equals a fifteenth set that includes a third attribute of the forty-sixth data structure, wherein the fifteenth set includes a third attribute of the forty-seventh data structure;

if a first attribute of a forty-ninth data structure equals a first attribute of a fiftieth data structure, and if a second attribute of the forty-ninth data structure equals a second attribute of the fiftieth data structure, then combining the forty-ninth data structure and the fiftieth data structure into a fifty-first data structure, wherein a third attribute of the fifty-first data structure equals a sixteenth set that includes a third attribute of the forty-ninth data structure, wherein the sixteenth set includes a third attribute of the fiftieth data structure; and if a first attribute of a fifty-second data structure equals a first attribute of a fifty-third data structure, and if a second attribute of the fifty-second data structure equals a second attribute of the fifty-third data structure, then combining the fifty-second data structure and the fifty-third data structure into a fifty-fourth data structure, wherein a third attribute of the fifty-fourth data structure equals a seventeenth set that includes a third attribute of the fifty-second data structure, wherein the seventeenth set includes a third attribute of the fifty-third data structure.

13. A method of removing redundancies from an original list of policies, the method comprising the computer-implemented steps of:

sorting the original list of policies into lists that include at least a first list and a second list, wherein a source object of each policy in the first list equals a first value, and wherein a source object of each policy in the second list equals a second value;

sorting policies in the first list into sub-lists that include at least a first sub-list and a second sub-list, wherein a destination object of each policy in the first sub-list equals a third value, and wherein a destination object of each policy in the second sub-list equals a fourth value;

sorting policies in the second list into sub-lists that include at least a third sub-list and a fourth sub-list, wherein a destination object of each policy in the third sub-list equals a fifth value, and wherein a destination object of each policy in the fourth sub-list equals a sixth value; and combining policies in the first sub-list into a first policy, wherein a service object of the first policy equals an object group that includes, without duplication, service objects of each policy in the first sub-list;

wherein said combining reduces a size of the original list.

14. A method as recited in claim 13, further comprising the steps of:

combining policies in the second sub-list into a second policy, wherein a service object of the second policy equals an object group that includes service objects of each policy in the second sub-list;

combining policies in the third sub-list into a third policy, wherein a service object of the third policy equals an object group that includes service objects of each policy in the third sub-list; and combining policies in the fourth sub-list into a fourth policy, wherein a service object of the fourth policy equals an object group that includes service objects of each policy in the fourth sub-list.

15. A method as recited in claim 14, further comprising the steps of:

if a source object of the first policy equals a source object of the second policy, and if a service object of the first policy equals a service object of the second policy, then combining the first policy and the second policy into a fifth policy, wherein a destination object of the fifth policy equals a first object group that includes a destination object of the first policy, wherein the first object group includes a destination object of the second policy;

if a source object of a sixth policy equals a source object of the third policy, and if a service object of the sixth policy equals the service object of the third policy, then combining the sixth policy and the third policy into a seventh policy, wherein a destination object of the seventh policy equals a second object group that includes a destination object of the third policy, wherein the second object group includes a destination object of the sixth policy; and if a source object of an eighth policy equals a source object of the fourth policy, and if a service object of the eighth policy equals the service object of the fourth policy, then combining the eighth policy and the fourth policy into a ninth policy, wherein a destination object of the ninth policy equals a third object group that includes a destination object of the fourth policy, wherein the third object group includes a destination object of the eighth policy.

16. A method as recited in claim 15, further comprising the steps of:

if a destination object of a tenth policy equals a destination object of an eleventh policy, and if a service object of the tenth policy equals a service object of the eleventh policy, then combining the tenth policy and the eleventh policy into a twelfth policy, wherein a source object of the twelfth policy equals a fourth object group that includes a source object of the tenth policy, wherein the fourth object group includes a source object of the eleventh policy;

if a destination object of a thirteenth policy equals a destination object of a fourteenth policy, and if a service object of the thirteenth policy equals a service object of the fourteenth policy, then combining the thirteenth policy and the fourteenth policy into a fifteenth policy, wherein a source object of the fifteenth policy equals a fifth object group that includes a source object of the thirteenth policy, wherein the fifth object group includes a source object of the fourteenth policy; and if a destination object of a sixteenth policy equals a destination object of a seventeenth policy, and if a service object of the sixteenth policy equals a service object of the seventeenth policy, then combining the sixteenth policy and the seventeenth policy into an eighteenth policy, wherein a source object of the eighteenth policy equals a sixth object group that includes a source object of the sixteenth policy, wherein the sixth object group includes a source object of the seventeenth policy.

17. A method as recited in claim 16, further comprising the steps of:

sorting policies, including the fifth, seventh, ninth, twelfth, fifteenth, and eighteenth policies, into lists that include at least a third list and a fourth list, wherein a destination object of each policy in the third list equals a seventh value, and wherein a destination object of each policy in the fourth list equals an eighth value;

sorting policies in the third list into sub-lists that include at least a fifth sub-list and a sixth sub-list, wherein a service object of each policy in the fifth sub-list equals a ninth value, and wherein a service object of each policy in the sixth sub-list equals a tenth value;

sorting policies in the fourth list into sub-lists that include at least a seventh sub-list and an eighth sub-list, wherein a service object of each policy in the seventh sub-list equals an eleventh value, and wherein a service object of each policy in the eighth sub-list equals a twelfth value; and combining policies in the fifth sub-list into a nineteenth policy, wherein a source object of the nineteenth policy equals an object group that includes source objects of each policy in the fifth sub-list.

18. A method as recited in claim 17, further comprising the steps of:

combining policies in the sixth sub-list into a twentieth policy, wherein a source object of the twentieth policy equals an object group that includes source objects of each policy in the sixth sub-list;

combining policies in the seventh sub-list into a twenty-first policy, wherein a source object of the twenty-first policy equals an object group that includes source objects of each policy in the seventh sub-list; and combining policies in the eighth sub-list into a twenty-second policy, wherein a source object of the twenty-second policy equals an object group that includes source objects of each policy in the eighth sub-list.

19. A method as recited in claim 18, further comprising the steps of:

if a destination object of the nineteenth policy equals a destination object of the twentieth policy, and if a source object of the nineteenth policy equals a source object of the twentieth policy, then combining the nineteenth policy and the twentieth policy into a twenty-third policy, wherein a service object of the twenty-third policy equals a seventh object group that includes a service object of the nineteenth policy, wherein the seventh object group includes a service object of the twentieth policy;

if a destination object of a twenty-fourth policy equals a destination object of the twenty-first policy, and if a source object of the twenty-fourth policy equals the source object of the twenty-first policy, then combining the twenty-fourth policy and the twenty-first policy into a twenty-fifth policy, wherein a service object of the twenty-fifth policy equals an eighth object group that includes a service object of the twenty-first policy, wherein the eighth object group includes a service object of the twenty-fourth policy; and if a destination object of a twenty-sixth policy equals a destination object of the twenty-second policy, and if a source object of the twenty-sixth policy equals the source object of the twenty-second policy, then combining the twenty-sixth policy and the twenty-second policy into a twenty-seventh policy, wherein a service object of the twenty-seventh policy equals a ninth object group that includes a service object of the twenty-second policy, wherein the ninth object group includes a service object of the twenty-sixth policy.

20. A method as recited in claim 19, further comprising the steps of:

if a service object of a twenty-eighth policy equals a service object of a twenty-ninth policy, and if a source object of the twenty-eighth policy equals a source object of the twenty-ninth policy, then combining the twenty-eighth policy and the twenty-ninth policy into a thirtieth policy, wherein a destination object of the thirtieth policy equals a tenth object group that includes a destination object of the twenty-eighth policy, wherein the tenth object group includes a destination object of the twenty-ninth policy;

if a service object of a thirty-first policy equals a service object of a thirty-second policy, and if a source object of the thirty-first policy equals a source object of the thirty-second policy, then combining the thirty-first policy and the thirty-second policy into a thirty-third policy, wherein a destination object of the thirty-third policy equals an eleventh object group that includes a destination object of the thirty-first policy, wherein the eleventh object group includes a destination object of the thirty-second policy; and if a service object of a thirty-fourth policy equals a service object of a thirty-fifth policy, and if a source object of the thirty-fourth policy equals a source object of the thirty-fifth policy, then combining the thirty-fourth policy and the thirty-fifth policy into a thirty-sixth policy, wherein a destination object of the thirty-sixth policy equals an eleventh object group that includes a destination object of the thirty-fourth policy, wherein the eleventh object group includes a destination object of the thirty-fifth policy.

21. A method as recited in claim 20, further comprising the steps of:

sorting policies, including the twenty-third, twenty-fifth, twenty-seventh, thirtieth, thirty-third, and thirty-sixth policies, into lists that include at least a fifth list and a sixth list, wherein a service object of each policy in the fifth list equals a thirteenth value, and wherein a service object of each policy in the sixth list equals a fourteenth value;

sorting policies in the fifth list into sub-lists that include at least a ninth sub-list and a tenth sub-list, wherein a source object of each policy in the ninth sub-list equals a fifteenth value, and wherein a source object of each policy in the tenth sub-list equals a sixteenth value;

sorting policies in the sixth list into sub-lists that include at least a eleventh sub-list and a twelfth sub-list, wherein a source object of each policy in the eleventh sub-list equals a seventeenth value, and wherein a source object of each policy in the twelfth sub-list equals an eighteenth value; and combining policies in the ninth sub-list into a thirty-seventh policy, wherein a destination object of the thirty-seventh policy equals an object group that includes destination objects of each policy in the ninth sub-list.

22. A method as recited in claim 21, further comprising the steps of:

combining policies in the tenth sub-list into a thirty-eighth policy, wherein a destination object of the thirty-eighth policy equals an object group that includes destination objects of each policy in the tenth sub-list;

combining policies in the eleventh sub-list into a thirty-ninth policy, wherein a destination object of the thirty-ninth policy equals an object group that includes destination objects of each policy in the eleventh sub-list; and combining policies in the twelfth sub-list into a fortieth policy, wherein a destination object of the fortieth policy equals an object group that includes destination objects of each policy in the twelfth sub-list.

23. A method as recited in claim 22, further comprising the steps of:

if a service object of the thirty-seventh policy equals a service object of the thirty-eighth policy, and if a destination object of the thirty-seventh policy equals a destination object of the thirty-eighth policy, then combining the thirty-seventh policy and the thirty-eighth policy into a forty-first policy, wherein a source object of the forty-first policy equals a twelfth object group that includes a source object of the thirty-seventh policy, wherein the twelfth object group includes a source object of the thirty-eighth policy;

if a service object of a forty-second policy equals a service object of the thirty-ninth policy, and if a destination object of the forty-second policy equals the destination object of the thirty-ninth policy, then combining the forty-second policy and the thirty-ninth policy into a forty-third policy, wherein a source object of the forty-third policy equals a thirteenth object group that includes a source object of the thirty-ninth policy, wherein the thirteenth object group includes a source object of the forty-second policy; and if a service object of a forty-fourth policy equals a service object of the fortieth policy, and if a destination object of the forty-fourth policy equals the destination object of the fortieth policy, then combining the forty-fourth policy and the fortieth policy into a forty-fifth policy, wherein a source object of the forty-fifth policy equals a fourteenth object group that includes a source object of the fortieth policy, wherein the fourteenth object group includes a source object of the forty-fourth policy.

24. A method as recited in claim 23, further comprising the steps of:

if a source object of a forty-sixth policy equals a source object of a forty-seventh policy, and if a destination object of the forty-sixth policy equals a destination object of the forty-seventh policy, then combining the forty-sixth policy and the forty-seventh policy into a forty-eighth policy, wherein a service object of the forty-eighth policy equals a fifteenth object group that includes a service object of the forty-sixth policy, wherein the fifteenth object group includes a service object of the forty-seventh policy;

if a source object of a forty-ninth policy equals a source object of a fiftieth policy, and if a destination object of the forty-ninth policy equals a destination object of the fiftieth policy, then combining the forty-ninth policy and the fiftieth policy into a fifty-first policy, wherein a service object of the fifty-first policy equals a sixteenth object group that includes a service object of the forty-ninth policy, wherein the sixteenth object group includes a service object of the fiftieth policy; and if a source object of a fifty-second policy equals a source object of a fifty-third policy, and if a destination object of the fifty-second policy equals a destination object of the fifty-third policy, then combining the fifty-second policy and the fifty-third policy into a fifty-fourth policy, wherein a service object of the fifty-fourth policy equals a seventeenth object group that includes a service object of the fifty-second policy, wherein the seventeenth object group includes a service object of the fifty-third policy.

25. A computer-readable storage medium carrying one or more sequences of instructions for removing redundancies from an original list of data structures, which instructions, when executed by one or more processors, cause the one or more processors to carry out the steps of:

sorting the original list of data structures into lists that include at least a first list and a second list, wherein a first attribute of each data structure in the first list equals a first value, and wherein a first attribute of each data structure in the second list equals a second value;

sorting data structures in the first list into sub-lists that include at least a first sub-list and a second sub-list, wherein a second attribute of each data structure in the first sub-list equals a third value, and wherein a second attribute of each data structure in the second sub-list equals a fourth value;

sorting data structures in the second list into sub-lists that include at least a third sub-list and a fourth sub-list, wherein a second attribute of each data structure in the third sub-list equals a fifth value, and wherein a second attribute of each data structure in the fourth sub-list equals a sixth value; and combining data structures in the first sub-list into a first data structure, wherein a third attribute of the first data structure equals a set that includes, without duplication, third attributes of each data structure in the first sub-list;

wherein said combining reduces a size of the original list.

26. A computer-readable storage medium as recited in claim 25, further comprising instructions which, when executed by the one or more processors, cause the one or more processors to carry out the steps of:

combining data structures in the second sub-list into a second data structure, wherein a third attribute of the second data structure equals a set that includes third attributes of each data structure in the second sub-list;

combining data structures in the third sub-list into a third data structure, wherein a third attribute of the third data structure equals a set that includes third attributes of each data structure in the third sub-list; and combining data structures in the fourth sub-list into a fourth data structure, wherein a third attribute of the fourth data structure equals a set that includes third attributes of each data structure in the fourth sub-list.

27. A computer-readable storage medium as recited in claim 26, further comprising instructions which, when executed by the one or more processors, cause the one or more processors to carry out the steps of:

if a first attribute of the first data structure equals a first attribute of the second data structure, and if a third attribute of the first data structure equals a third attribute of the second data structure, then combining the first data structure and the second data structure into a fifth data structure, wherein a second attribute of the fifth data structure equals a first set that includes a second attribute of the first data structure, wherein the first set includes a second attribute of the second data structure;

if a first attribute of a sixth data structure equals a first attribute of the third data structure, and if a third attribute of the sixth data structure equals the third attribute of the third data structure, then combining the sixth data structure and the third data structure into a seventh data structure, wherein a second attribute of the seventh data structure equals a second set that includes a second attribute of the third data structure, wherein the second set includes a second attribute of the sixth data structure; and if a first attribute of an eighth data structure equals a first attribute of the fourth data structure, and if a third attribute of the eighth data structure equals the third attribute of the fourth data structure, then combining the eighth data structure and the fourth data structure into a ninth data structure, wherein a second attribute of the ninth data structure equals a third set that includes a second attribute of the fourth data structure, wherein the third set includes a second attribute of the eighth data structure.

28. A computer-readable storage medium as recited in claim 27, further comprising instructions which, when executed by the one or more processors, cause the one or more processors to carry out the steps of:

if a second attribute of a tenth data structure equals a second attribute of an eleventh data structure, and if a third attribute of the tenth data structure equals a third attribute of the eleventh data structure, then combining the tenth data structure and the eleventh data structure into a twelfth data structure, wherein a first attribute of the twelfth data structure equals a fourth set that includes a first attribute of the tenth data structure, wherein the fourth set includes a first attribute of the eleventh data structure;

if a second attribute of a thirteenth data structure equals a second attribute of a fourteenth data structure, and if a third attribute of the thirteenth data structure equals a third attribute of the fourteenth data structure, then combining the thirteenth data structure and the fourteenth data structure into a fifteenth data structure, wherein a first attribute of the fifteenth data structure equals a fifth set that includes a first attribute of the thirteenth data structure, wherein the fifth set includes a first attribute of the fourteenth data structure; and if a second attribute of a sixteenth data structure equals a second attribute of a seventeenth data structure, and if a third attribute of the sixteenth data structure equals a third attribute of the seventeenth data structure, then combining the sixteenth data structure and the seventeenth data structure into an eighteenth data structure, wherein a first attribute of the eighteenth data structure equals a sixth set that includes a first attribute of the sixteenth data structure, wherein the sixth set includes a first attribute of the seventeenth data structure.

29. A computer-readable storage medium as recited in claim 28, further comprising instructions which, when executed by the one or more processors, cause the one or more processors to carry out the steps of:

sorting data structures, including the fifth, seventh, ninth, twelfth, and fifteenth data structures, into lists that include at least a third list and a fourth list, wherein a second attribute of each data structure in the third list equals a seventh value, and wherein a second attribute of each data structure in the fourth list equals an eighth value;

sorting data structures in the third list into sub-lists that include at least a fifth sub-list and a sixth sub-list, wherein a third attribute of each data structure in the fifth sub-list equals a ninth value, and wherein a third attribute of each data structure in the sixth sub-list equals a tenth value;

sorting data structures in the fourth list into sub-lists that include at least a seventh sub-list and an eighth sub-list, wherein a third attribute of each data structure in the seventh sub-list equals an eleventh value, and wherein a third attribute of each data structure in the eighth sub-list equals a twelfth value; and combining data structures in the fifth sub-list into a nineteenth data structure, wherein a first attribute of the nineteenth data structure equals a set that includes first attributes of each data structure in the fifth sub-list.

30. A computer-readable storage medium as recited in claim 29, further comprising instructions which, when executed by the one or more processors, cause the one or more processors to carry out the steps of:

combining data structures in the sixth sub-list into a twentieth data structure, wherein a first attribute of the twentieth data structure equals a set that includes first attributes of each data structure in the sixth sub-list;

combining data structures in the seventh sub-list into a twenty-first data structure, wherein a first attribute of the twenty-first data structure equals a set that includes first attributes of each data structure in the seventh sub-list; and combining data structures in the eighth sub-list into a twenty-second data structure, wherein a first attribute of the twenty-second data structure equals a set that includes first attributes of each data structure in the eighth sub-list.

31. A computer-readable storage medium as recited in claim 30, further comprising instructions which, when executed by the one or more processors, cause the one or more processors to carry out the steps of:

if a second attribute of the nineteenth data structure equals a second attribute of the twentieth data structure, and if a first attribute of the nineteenth data structure equals a first attribute of the twentieth data structure, then combining the nineteenth data structure and the twentieth data structure into a twenty-third data structure, wherein a third attribute of the twenty-third data structure equals a seventh set that includes a third attribute of the nineteenth data structure, wherein the seventh set includes a third attribute of the twentieth data structure;

if a second attribute of a twenty-fourth data structure equals a second attribute of the twenty-first data structure, and if a first attribute of the twenty-fourth data structure equals the first attribute of the twenty-first data structure, then combining the twenty-fourth data structure and the twenty-first data structure into a twenty-fifth data structure, wherein a third attribute of the twenty-fifth data structure equals an eighth set that includes a third attribute of the twenty-first data structure, wherein the eighth set includes a third attribute of the twenty-fourth data structure; and if a second attribute of a twenty-sixth data structure equals a second attribute of the twenty-second data structure, and if a first attribute of the twenty-sixth data structure equals the first attribute of the twenty-second data structure, then combining the twenty-sixth data structure and the twenty-second data structure into a twenty-seventh data structure, wherein a third attribute of the twenty-seventh data structure equals a ninth set that includes a third attribute of the twenty-second data structure, wherein the ninth set includes a third attribute of the twenty-sixth data structure.

32. A computer-readable storage medium as recited in claim 31, further comprising instructions which, when executed by the one or more processors, cause the one or more processors to carry out the steps of:

if a third attribute of a twenty-eighth data structure equals a third attribute of a twenty-ninth data structure, and if a first attribute of the twenty-eighth data structure equals a first attribute of the twenty-ninth data structure, then combining the twenty-eighth data structure and the twenty-ninth data structure into a thirtieth data structure, wherein a second attribute of the thirtieth data structure equals a tenth set that includes a second attribute of the twenty-eighth data structure, wherein the tenth set includes a second attribute of the twenty-ninth data structure;

if a third attribute of a thirty-first data structure equals a third attribute of a thirty-second data structure, and if a first attribute of the thirty-first data structure equals a first attribute of the thirty-second data structure, then combining the thirty-first data structure and the thirty-second data structure into a thirty-third data structure, wherein a second attribute of the thirty-third data structure equals an eleventh set that includes a second attribute of the thirty-first data structure, wherein the eleventh set includes a second attribute of the thirty-second data structure; and if a third attribute of a thirty-fourth data structure equals a third attribute of a thirty-fifth data structure, and if a first attribute of the thirty-fourth data structure equals a first attribute of the thirty-fifth data structure, then combining the thirty-fourth data structure and the thirty-fifth data structure into a thirty-sixth data structure, wherein a second attribute of the thirty-sixth data structure equals an eleventh set that includes a second attribute of the thirty-fourth data structure, wherein the eleventh set includes a second attribute of the thirty-fifth data structure.

33. A computer-readable storage medium as recited in claim 32, further comprising instructions which, when executed by the one or more processors, cause the one or more processors to carry out the steps of:

sorting data structures, including the twenty-third, twenty-fifth, twenty-seventh, thirtieth, thirty-third, and thirty-sixth data structures, into lists that include at least a fifth list and a sixth list, wherein a third attribute of each data structure in the fifth list equals a thirteenth value, and wherein a third attribute of each data structure in the sixth list equals a fourteenth value;

sorting data structures in the fifth list into sub-lists that include at least a ninth sub-list and a tenth sub-list, wherein a first attribute of each data structure in the ninth sub-list equals a fifteenth value, and wherein a first attribute of each data structure in the tenth sub-list equals a sixteenth value;

sorting data structures in the sixth list into sub-lists that include at least a eleventh sub-list and a twelfth sub-list, wherein a first attribute of each data structure in the eleventh sub-list equals a seventeenth value, and wherein a first attribute of each data structure in the twelfth sub-list equals an eighteenth value; and combining data structures in the ninth sub-list into a thirty-seventh data structure, wherein a second attribute of the thirty-seventh data structure equals a set that includes second attributes of each data structure in the ninth sub-list.

34. A computer-readable storage medium as recited in claim 33, further comprising instructions which, when executed by the one or more processors, cause the one or more processors to carry out the steps of:

combining data structures in the tenth sub-list into a thirty-eighth data structure, wherein a second attribute of the thirty-eighth data structure equals a set that includes second attributes of each data structure in the tenth sub-list;

combining data structures in the eleventh sub-list into a thirty-ninth data structure, wherein a second attribute of the thirty-ninth data structure equals a set that includes second attributes of each data structure in the eleventh sub-list; and combining data structures in the twelfth sub-list into a fortieth data structure, wherein a second attribute of the fortieth data structure equals a set that includes second attributes of each data structure in the twelfth sub-list.

35. A computer-readable storage medium as recited in claim 34, further comprising instructions which, when executed by the one or more processors, cause the one or more processors to carry out the steps of:

if a third attribute of the thirty-seventh data structure equals a third attribute of the thirty-eighth data structure, and if a second attribute of the thirty-seventh data structure equals a second attribute of the thirty-eighth data structure, then combining the thirty-seventh data structure and the thirty-eighth data structure into a forty-first data structure, wherein a first attribute of the forty-first data structure equals a twelfth set that includes a first attribute of the thirty-seventh data structure, wherein the twelfth set includes a first attribute of the thirty-eighth data structure;

if a third attribute of a forty-second data structure equals a third attribute of the thirty-ninth data structure, and if a second attribute of the forty-second data structure equals the second attribute of the thirty-ninth data structure, then combining the forty-second data structure and the thirty-ninth data structure into a forty-third data structure, wherein a first attribute of the forty-third data structure equals a thirteenth set that includes a first attribute of the thirty-ninth data structure, wherein the thirteenth set includes a first attribute of the forty-second data structure; and if a third attribute of a forty-fourth data structure equals a third attribute of the fortieth data structure, and if a second attribute of the forty-fourth data structure equals the second attribute of the fortieth data structure, then combining the forty-fourth data structure and the fortieth data structure into a forty-fifth data structure, wherein a first attribute of the forty-fifth data structure equals a fourteenth set that includes a first attribute of the fortieth data structure, wherein the fourteenth set includes a first attribute of the forty-fourth data structure.

36. A computer-readable storage medium as recited in claim 35, further comprising instructions which, when executed by the one or more processors, cause the one or more processors to carry out the steps of:
- if a first attribute of a forty-sixth data structure equals a first attribute of a forty-seventh data structure, and if a second attribute of the forty-sixth data structure equals a second attribute of the forty-seventh data structure, then combining the forty-sixth data structure and the forty-seventh data structure into a forty-eighth data structure, wherein a third attribute of the forty-eighth data structure equals a fifteenth set that includes a third attribute of the forty-sixth data structure, wherein the fifteenth set includes a third attribute of the forty-seventh data structure;
- if a first attribute of a forty-ninth data structure equals a first attribute of a fiftieth data structure, and if a second attribute of the forty-ninth data structure equals a second attribute of the fiftieth data structure, then combining the forty-ninth data structure and the fiftieth data structure into a fifty-first data structure, wherein a third attribute of the fifty-first data structure equals a sixteenth set that includes a third attribute of the forty-ninth data structure, wherein the sixteenth set includes a third attribute of the fiftieth data structure; and
- if a first attribute of a fifty-second data structure equals a first attribute of a fifty-third data structure, and if a second attribute of the fifty-second data structure equals a second attribute of the fifty-third data structure, then combining the fifty-second data structure and the fifty-third data structure into a fifty-fourth data structure, wherein a third attribute of the fifty-fourth data structure equals a seventeenth set that includes a third attribute of the fifty-second data structure, wherein the seventeenth set includes a third attribute of the fifty-third data structure.

37. An apparatus embodied in a computer system for removing redundancies from an original list of data structures, comprising:
- means for sorting the original list of data structures into lists that include at least a first list and a second list, wherein a first attribute of each data structure in the first list equals a first value, and wherein a first attribute of each data structure in the second list equals a second value;
- means for sorting data structures in the first list into sub-lists that include at least a first sub-list and a second sub-list, wherein a second attribute of each data structure in the first sub-list equals a third value, and wherein a second attribute of each data structure in the second sub-list equals a fourth value;
- means for sorting data structures in the second list into sub-lists that include at least a third sub-list and a fourth sub-list, wherein a second attribute of each data structure in the third sub-list equals a fifth value, and wherein a second attribute of each data structure in the fourth sub-list equals a sixth value; and
- means for combining data structures in the first sub-list into a first data structure, wherein a third attribute of the first data structure equals a set that includes, without duplication, third attributes of each data structure in the first sub-list;
- wherein said combining reduces a size of the original list.

38. An apparatus for removing redundancies from an original list of data structures, comprising:
- a network interface that is coupled to a data network for receiving one or more packet flows therefrom;
- a processor;
- one or more stored sequences of instructions, which, when executed by the processor, cause the processor to carry out the steps of:
  - sorting the original list of data structures into lists that include at least a first list and a second list, wherein a first attribute of each data structure in the first list equals a first value, and wherein a first attribute of each data structure in the second list equals a second value;
  - sorting data structures in the first list into sub-lists that include at least a first sub-list and a second sub-list, wherein a second attribute of each data structure in the first sub-list equals a third value, and wherein a second attribute of each data structure in the second sub-list equals a fourth value;
  - sorting data structures in the second list into sub-lists that include at least a third sub-list and a fourth sub-list, wherein a second attribute of each data structure in the third sub-list equals a fifth value, and wherein a second attribute of each data structure in the fourth sub-list equals a sixth value; and
  - combining data structures in the first sub-list into a first data structure, wherein a third attribute of the first data structure equals a set that includes, without duplication, third attributes of each data structure in the first sub-list;
- wherein said combining reduces a size of the original list.

39. A method of removing redundancies from an access control list comprising a plurality of entries, wherein each of the entries comprises a source value, a destination value, a service value, and an action value, the method comprising the computer-implemented steps of:
- sorting entries in the access control list into lists that include at least a first list and a second list, wherein a source value of each entry in the first list equals a first subnetwork address range, and wherein a source value of each entry in the second list equals a second subnetwork address range;
- sorting entries in the first list into sub-lists that include at least a first sub-list and a second sub-list, wherein a destination value of each entry in the first sub-list equals a first web server address, and wherein a destination value of each entry in the second sub-list equals a second web server address;
- sorting entries in the second list into sub-lists that include at least a third sub-list and a fourth sub-list, wherein a destination value of each entry in the third sub-list equals a third web server address, and wherein a destination value of each entry in the fourth sub-list equals a fourth web server address; and
- combining entries in the first sub-list into a first entry, wherein a service value of the first entry equals an object group that includes, without duplication, service values of each entry in the first sub-list;
- wherein said combining reduces a size of the access control list.

* * * * *